Patented June 12, 1951

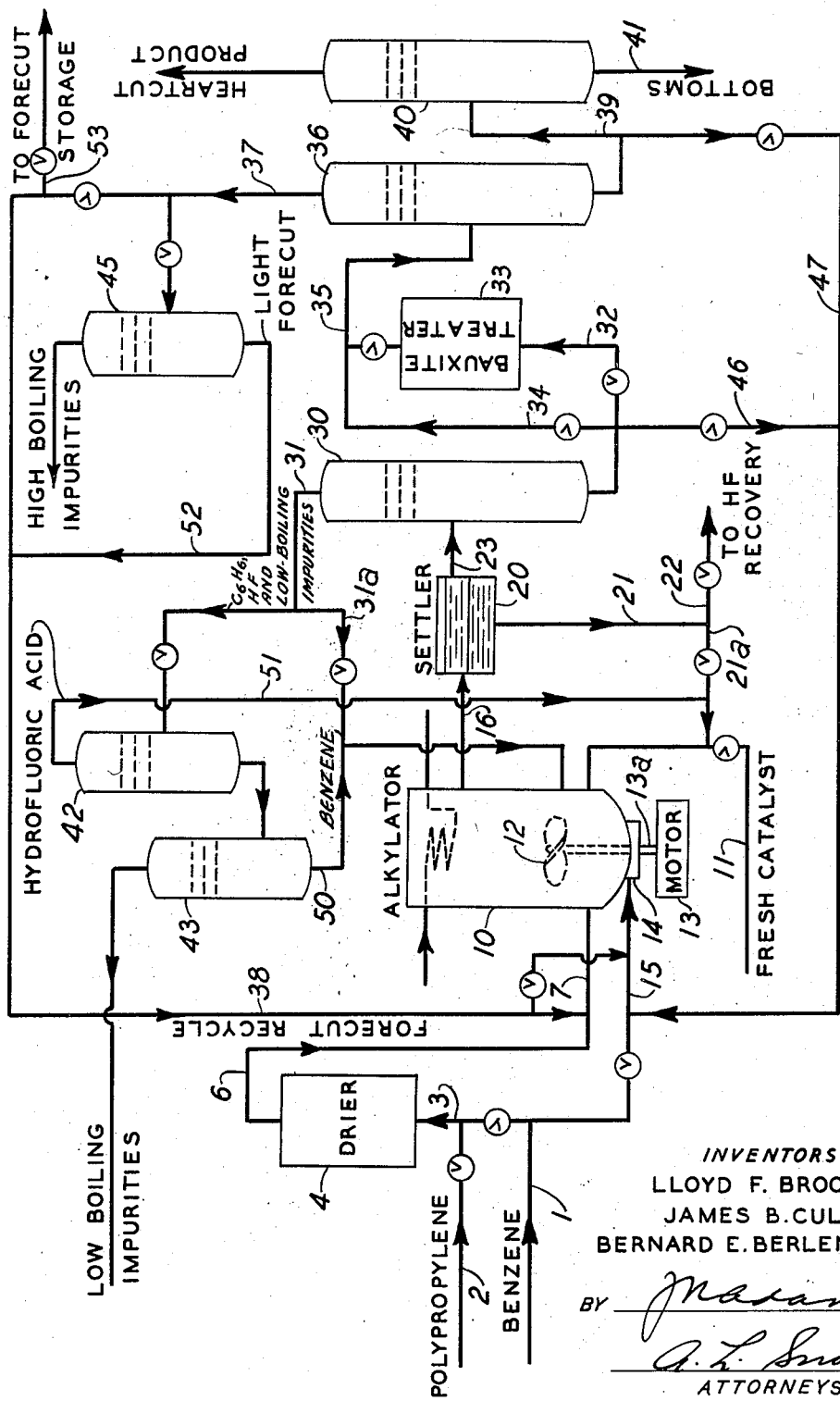

2,556,644

UNITED STATES PATENT OFFICE 2,556,644

THERMAL DEFLUORINATION OF ALKYLATED AROMATIC HYDROCARBON MIXTURES

Lloyd F. Brooke, Berkeley, James B. Cull, Martinez, and Bernard E. Berlenbach, San Francisco, Calif., assignors to California Research Corporation, San Francisco, Calif., a corporation of Delaware Application June 2, 1947, Serial No. 751,936

8 Claims. (Cl. 260—671)

This invention relates to the treatment of aromatic hydrocarbon materials, and more specifically it pertains to the removal of fluorine from the products of alkylation of benzene in the presence of hydrofluoric acid as a catalyst.

In the alkylation of benzene with olefins, for instance, with polymers of propylene containing from 9 to 18 carbon atoms, and preferably from 12 to 15 carbon atoms, in the presence of hydrofluoric acid as a catalyst, small proportions of organic fluorine compounds are formed, owing to the combination of hydrofluoric acid with hydrocarbon material. The exact nature of these compounds is not known, but they are believed to be for the most part alkyl and/or aryl fluorides. Upon separation of the alkylation mixture by settling into a lower acid-catalyst phase and an upper oil-hydrocarbon phase, these fluorine-containing compounds, and even some of the free hydrofluoric acid, pass into the oil phase.

The presence of these fluorine-containing compounds in the oil phase gives rise to considerable difficulties in the course of the subsequent recovery of the product, namely, of monoalkyl benzenes containing from 9 to 18 carbon atoms, and preferably from 12 to 15 carbon atoms, in the alkyl chain. These undesirable fluorine-bearing compounds are not completely removed by treating the oil phase with alkaline solutions, such as a solution of caustic soda or the like. In the recovery of the various alkyl benzene cuts contained in the crude alkylation product by fractional distillation at elevated temperatures, these fluorine compounds tend to decompose and to form hydrofluoric acid with its attendant corrosion of the product recovery equipment. When the mono-alkyl benzene product, such as the product containing from 9 to 18 carbon atoms, and preferably from 12 to 15 carbon atoms, in the alkyl chain, is to be used ultimately in the form of a corresponding sulfonate as a wetting agent or detergent, the presence of such fluorine-bearing compounds and/or even minute traces of hydrofluoric acid is definitely inadmissible.

Various porous solid contact materials, particularly those suitable as catalysts for hydrogenation or dehydrogenation reactions, such as alumina, dehydrated bauxite, zirconia, magnesia, limonite and the like, have been used with a fair degree of success to effect the removal of the organic fluorine compounds from the crude alkylation product contained in the oil phase separated from the acid phase upon settling of the original alkylation efflux. However, the use of such contact materials is accompanied by a corresponding increase in costs, as it requires frequent replacement of spent contact materials, and unless two, or more than two, parallel treating columns are provided, prevents a continuous operation of the entire process.

It has now been found that the undesirable fluorine-containing organic compounds may be effectively and substantially completely defluorinated by a thermal treatment of the oil phase within certain limits of temperature and pressure in a fractionating column, while simultaneously distilling off unreacted benzene present in said oil phase. Moreover, this thermal treatment is carried out without unduly affecting the carbon-to-carbon structure of hydrocarbons in the oil phase. The hydrofluoric acid which may have passed into the oil phase upon the initial settling of the alkylation efflux, and that acid which is formed as a consequence of the aforementioned thermal treatment of the oil phase, pass overhead with excess benzene and may be recycled to the alkylation zone. Otherwise, the acid may be separated from benzene by any conventional separation method, whereupon the two materials will be utilized for separate applications, as may be desired.

The particular thermal defluorination treatment of the oil phase in accordance with the present invention is effected at a temperature from about 425° F. to about 550° F., and preferably from about 425° F. to about 450° F., with pressures ranging correspondingly from the atmospheric to about 15–20 p. s. i. g. to obtain an adequate defluorination of the crude alkylate product.

The understanding of the operation and of the advantages of the invention is facilitated by reference to the accompanying drawing which represents a flow diagram illustrating a continuous process of alkylating benzene with olefins in the presence of hydrofluoric acid as a catalyst, comprising the particular step of thermal defluorination of the present invention.

In the diagram, benzene and polypropylene containing from 12 to 15 carbon atoms and produced, e. g., by the polymerization of desulfurizer reflux gas, are fed through valve-controlled lines 1 and 2 to line 3, and thence to a suitable drying or dehydrating means 4 where moisture is removed from the combined feed. On leaving drier 4, the feed passes through lines 6 and 7 into alkylator 10, the fresh hydrofluoric acid catalyst being supplied to the alkylator through line 11. Alkylator 10 is operated in the range of temperatures between that slightly above the freezing temperature of the reaction mixture and about 150° F., with pressures sufficient to maintain the alkylation mixture in the liquid phase. The alkylator consists essentially of a steel reaction vessel provided with appropriate means for temperature control, e. g., by internal cooling, and with a paddle mixer or stirrer 12 for effecting an intimate contact of the reactants and catalyst. This stirrer is actuated by a motor 13, to which it is connected by a shaft 13a. Both the bearing and the packing for this shaft are made of acid-resistant materials. Deterioration of stirrer-shaft packing 14 by the corrosive action of the acid is prevented in part by introducing additional benzene from line 1 through valve-controlled line 15 onto the packing, and thence into alkylator 10. In this way benzene sweeps away the acid catalyst from the packing and the bearing of the shaft, acting as a protective flushing oil.

After remaining in alkylator 10 for a period of time sufficiently long to avoid incomplete alkylation, the resulting reaction mixture is directed through line 16 into settler 20 where two phases are separated. The reaction mixture is allowed to settle so as to effect a good phase separation, and hence to secure a satisfactory color of the alkylate product. After settling, the lower acid phase is recycled through lines 21, 21a and 11 to alkylator 10 or may be withdrawn through line 21 and acid-recovery line 22 to be regenerated or discarded. The upper oil phase passes through line 23 to a fractionating column 30. This column is operated at a bottom temperature ranging from about 425° F. to about 550° F. and a pressure from about atmospheric to about 15–20 p. s. i. g. Ordinarily, however, it is preferred to operate at temperatures from about 425° F. to about 450° F. and under pressures corresponding thereto. By operating column 30 in accordance with the present invention within the ranges of temperature and pressure disclosed hereinabove, it is possible not only to separate by distillation the unreacted benzene, but—and this is a particularly important improvement heretofore unknown in the art—also to bring about simultaneously an adequate thermal defluorination of the product mixture at this stage of the process. The thermal defluorination simultaneous with the distillation of benzene does away with the losses of hydrofluoric acid occasioned by the combination thereof with hydrocarbon material, and facilitates a thorough stripping of the acid from the oil-phase mixture. As compared with previously known procedures, thermal defluorination, in accordance with the present invention, effects a saving of materials and substantially improves the over-all efficiency of the alkylation process.

As indicated above, benzene is removed from column 30 as a vapor phase overhead together with some hydrofluoric acid, and is either recycled through lines 31 and 31a to alkylator 10 or may be withdrawn from line 31 to be purified by separation from hydrofluoric acid and utilized elsewhere, for instance, in the blending of gasoline. The defluorinated, benzene-free hydrocarbon mixture may be sent from the bottom of column 30 through line 32 into a bauxite treater 33, if desired. However, the use of bauxite treater 33 is optional and in general unnecessary, the thermal defluorination in fractionating column 30, in accordance with the present invention, being entirely adequate to free the product mixture from fluorine. Therefore, bauxite treater 33 may be omitted, though it is sometimes included as a safety factor, and the mixture is passed through lines 32, 34 and 35 to fractionating column 36. In column 36 the forecut is distilled overhead and may be recycled through lines 37, 38 and 7 into alkylator 10. A portion of the recycled forecut may be diverted into line 15 to replace or supplement benzene as a flushing oil for the stirrer-shaft packing and bearing of the alkylator.

Should it be desired, however, to withdraw the alkylate forecut, or a portion thereof, from the system instead of recycling it to the alkylator, this may be accomplished by directing the overhead from column 36 through line 37 into line 53.

The alkyl benzene product which remains after the distillation of light forecut from forecut fractionator 36 is passed through line 39 to a fractionator 40, whence the desired $C_{12}$—$C_{15}$ alkyl benzene heart cut is recovered as overhead, while the bottoms boiling above about 600° F. are discharged through line 41.

If desired, in accordance with the particular set of operating conditions, the flushing of the stirrer-shaft packing and bearing may be accomplished by diverting into line 15 a portion of the crude alkylate stream from line 32, or a portion of the stream from line 39, through the corresponding lines 46 or 47.

In the continuous operation of the alkylation process hereindescribed, impurities tend to accumulate in the oil phase of the alkylation system. These impurities may be either high boiling or low boiling with reference to the boiling temperature of benzene. Those impurities, which boil at temperatures lower than the boiling temperature of benzene, may be removed in vapor phase with the benzene recycle as overhead from the combination benzene-fractionator and defluorinator 30. The benzene recycle stream entering line 31 from fractionating column 30 comprises benzene, some hydrofluoric acid and the aforementioned low-boiling impurities. These various components of the benzene-recycle stream are subsequently separated from each other by distillation in an appropriate system of fractionation columns 42 and 43, as shown in the flow diagram. Upon separation, benzene and hydrofluoric acid may be re-used in the process, as shown by lines 50 and 51, while the impurities are discarded. On the other hand, those impurities, accumulated in the continuous alkylation, which boil at temperatures higher than the boiling temperature of benzene, may be removed as a part of the light forecut recycle stream recovered as a vapor-phase overhead from fractionator 36 and are subsequently separated from the alkylate forecut by an appropriate fractional distillation in column 45, as shown in the flow diagram, and rejected, the forecut being returned through line 52 into recycle line 38, and thence to alkylator 10.

The features of the alkylation process herein disclosed and claimed by the present applicants are those of thermal defluorination of the oil phase obtained in the alkylation of benzene at a temperature from about 425° F. to about 550° F. and under a pressure from the atmospheric to about 15–20 p. s. i. g. and the simultaneous removal of the resulting hydrogen fluoride and unreacted benzene from the crude alkylate product by fractional distillation. Various other novel features of the process are the sole invention of Lloyd F. Brooke and are claimed in his co-pending application Serial No. 751,935, filed June 2, 1947, now abandoned.

It is to be understood by those skilled in the art that the flow diagram of the drawing is wholly schematic, and does not show the appropriate accessory equipment, such as preheaters, valves, and the like, which are used in large plants and constitute well known expedients within the scope of the invention.

Likewise, it is to be appreciated that many modifications and embodiments of the present invention may be practiced by those skilled in the art, in the light of the teachings of the disclosure hereinbefore without departing from the spirit thereof and from the scope of the following claims.

We claim:

1. A process for defluorinating organic fluorine compounds present in a mixture with benzene, alkyl benzenes and free hydrofluoric acid, such as normally occurs in the oil phase of a product obtained by alkylating benzene with propylene polymers in the presence of a hydrofluoric acid as a catalyst, which comprises heating said mixture at from about 425° F. to about 550° F. under pressures ranging from atmospheric to about 20 p. s. i. g., and converting the fluorine of the organic fluorine compounds into recoverable hydrofluoric acid.

2. A process as defined in claim 1, wherein said mixture is heated from about 425° F. to about 450° F.

3. A process for defluorinating organic fluorine compounds present in a mixture with benzene, alkyl benzenes and free hydrofluoric acid, such as normally occurs in the oil phase of a product obtained by alkylating benzene with propylene polymers in the presence of hydrofluoric acid as a catalyst, which comprises heating said mixture at from about 425° F. to about 550° F. under pressures ranging from atmospheric to about 20 p. s. i. g. to effect decomposition of said organic fluorine compounds, and recovering the resulting hydrofluoric acid by distillation overhead in combination with free hydrofluoric acid and benzene initially present in the mixture.

4. A process as defined in claim 3, wherein said mixture is heated at a temperature from about 425° F. to about 450° F.

5. In the process for the production of polypropyl benzene by contacting propylene polymers containing from 9 to 18 carbon atoms with an excess of benzene in the presence of hydrofluoric acid as an alkylation catalyst, the method of recovering a substantially fluorine-free polypropyl benzene which comprises settling the alkylation reaction product mixture to separate a lower acid phase and an upper oil phase comprising benzene, polypropyl benzene, and minor amount of hydrofluoric acid and fluorinated hydrocarbons; distilling said upper oil phase under a pressure sufficient to maintain a bottom temperature from about 425° to about 550° F.; and separating an overhead fraction comprising hydrofluoric acid and benzene and a bottoms fraction comprising polypropyl benzene substantially free of fluorine.

6. In the process for the production of polypropyl benzene by contacting propylene polymers containing from 9 to 18 carbon atoms with an excess of benzene in the presence of hydrofluoric acid as an alkylation catalyst, the method of recovering a substantially fluorine-free polypropyl benzene which comprises settling the alkylation reaction product mixture to separate a lower acid phase and an upper oil phase comprising benzene, polypropyl benzene, and minor amount of hydrofluoric acid and fluorinated hydrocarbons; distilling said upper oil phase under a pressure in the range from about the atmospheric to about 20 p. s. i. g. sufficient to maintain a bottom temperature from about 425 to about 550° F.; and separating an overhead fraction comprising hydrofluoric acid and benzene and a bottoms fraction comprising polypropyl benzene substantially free of fluorine.

7. In the process for the production of polypropyl benzene by contacting propylene polymers containing from 12 to 15 carbon atoms with an excess of benzene in the presence of hydrofluoric acid as an alkylation catalyst, the method of recovering a substantially fluorine-free polypropyl benzene which comprises settling the alkylation reaction product mixture to separate a lower acid phase and an upper oil phase comprising benzene, polypropyl benzene and minor amount of hydrofluoric acid and fluorinated hydrocarbons; distilling said upper oil phase under a pressure in the range from about atmospheric to about 20 p. s. i. g. and a bottom temperature in the range from about 425 to about 550° F.; and separating an overhead fraction comprising hydrofluoric acid and benzene and a bottoms fraction comprising polypropyl benzene substantially free of fluorine.

8. The method of recovering a substantially fluorine-free polypropyl benzene as defined in claim 7 wherein the bottom temperature for the distillation of said upper oil phase is comprised in the range from about 425 to about 450° F.

LLOYD F. BROOKE.
JAMES B. CULL.
BERNARD E. BERLENBACH.

REFERENCES CITED

The following references are of record in the file of this patent:

UNITED STATES PATENTS

| Number | Name | Date |
| --- | --- | --- |
| 2,013,030 | Calcott et al. | Sept. 3, 1935 |
| 2,333,649 | Grosse et al. | Nov. 9, 1943 |
| 2,349,211 | Tulleners | May 16, 1944 |
| 2,371,341 | Matuszak | Mar. 13, 1945 |
| 2,372,320 | Frey | Mar. 27, 1945 |
| 2,379,368 | Matuszak | June 26, 1945 |
| 2,388,135 | Frey | Oct. 30, 1945 |
| 2,404,340 | Zimmerman | July 16, 1946 |
| 2,413,205 | Word et al. | Dec. 24, 1946 |
| 2,433,020 | Becker | Dec. 23, 1947 |

OTHER REFERENCES

Henne et al.: "Reactivity and Influence of Fluorine in Aliphatic Compounds," Jour. Amer. Chem. Soc., vol. 58 (June 1936), pages 882-3, 4 (3 pages).